No. 648,876. Patented May 1, 1900.
S. T. McKNIGHT.
PLANTER.
(Application filed Oct. 7, 1899.)
(No Model.) 2 Sheets—Sheet 1.
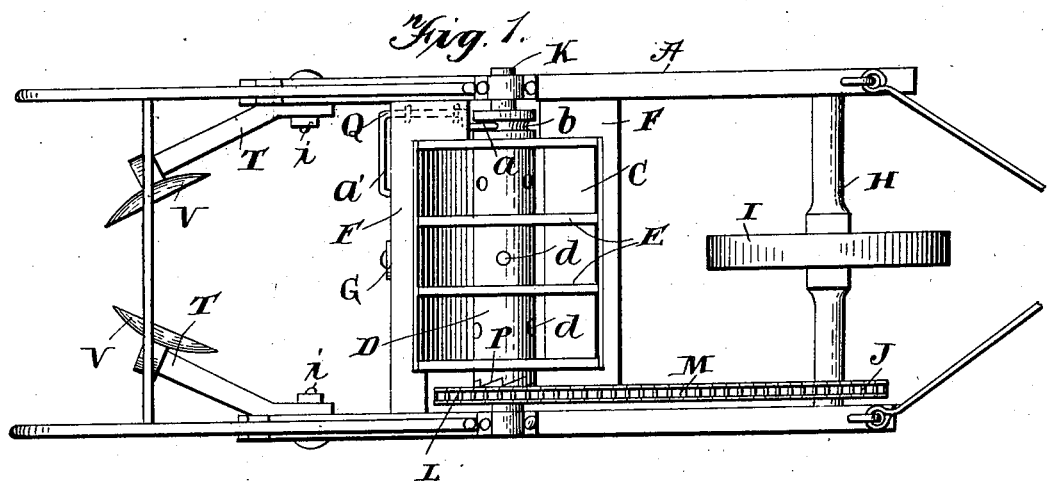
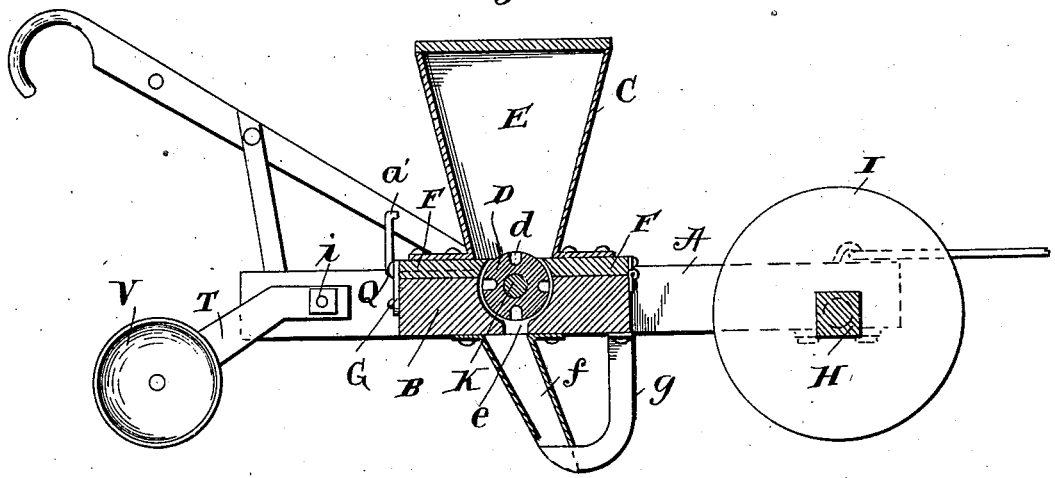
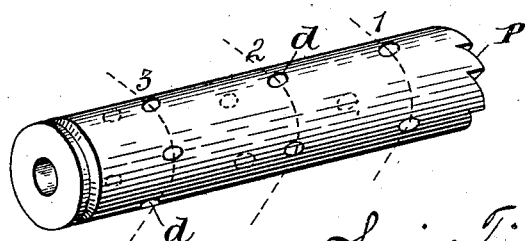

No. 648,876. Patented May 1, 1900.
S. T. McKNIGHT.
PLANTER.
(Application filed Oct. 7, 1899.)
(No Model.) 2 Sheets—Sheet 2.
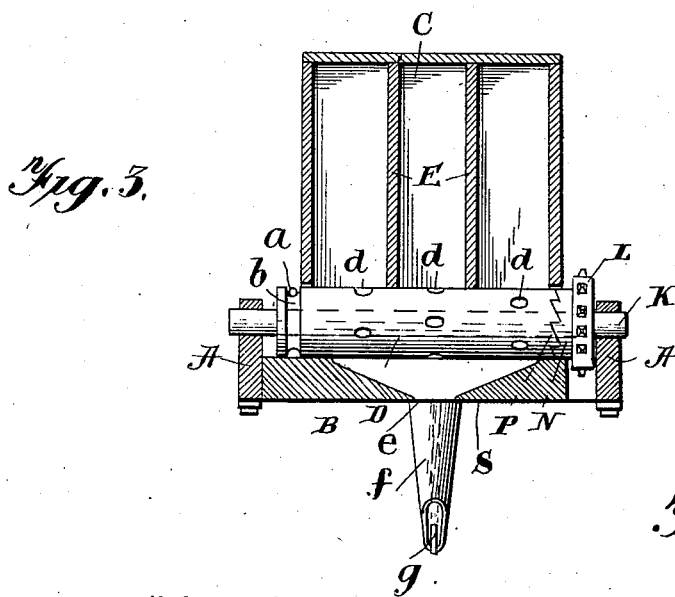
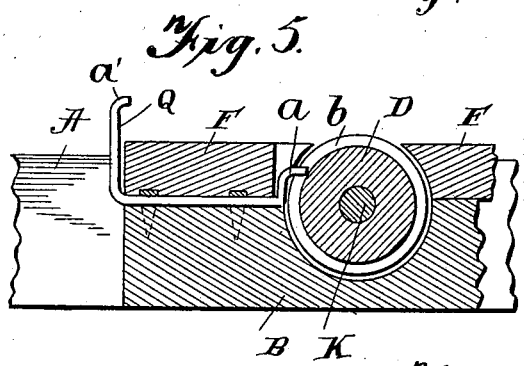
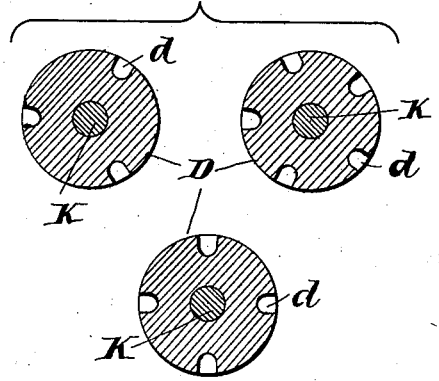
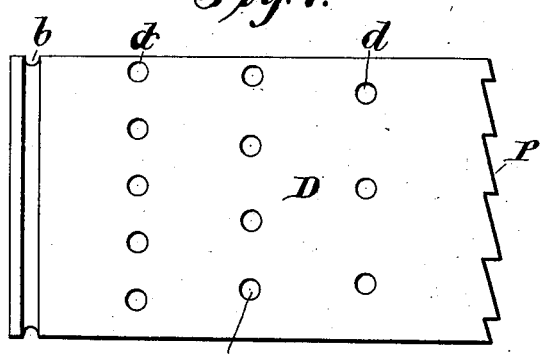
Witnesses
Geo. E. Fitch.
H. A. Campbell,
Inventor
Squire Timothy McKnight
by
J. N. Evans
Attorney

UNITED STATES PATENT OFFICE.

SQUIRE T. McKNIGHT, OF MINGO, MISSOURI, ASSIGNOR OF ONE-THIRD TO LESTER CLARENCE ROBERTS, OF SAME PLACE.

PLANTER.

SPECIFICATION forming part of Letters Patent No. 648,876, dated May 1, 1900.

Application filed October 7, 1899. Serial No. 732,888. (No model.)

*To all whom it may concern:*

Be it known that I, SQUIRE TIMOTHY MC-KNIGHT, a citizen of the United States, residing at Mingo, in the county of Stoddard and State of Missouri, have invented certain new and useful Improvements in Planters, of which the following is a specification.

My invention relates to improvements in planters, and pertains to a mechanism which is more particularly adapted for planting corn, though it may be used for planting other cereals without departing from the spirit of my invention.

In the accompanying drawings, Figure 1 is a top plan view of a planter embodying my invention, the top of the hopper being removed. Fig. 2 is a transverse sectional view taken through the center of the hopper and the feeding-cylinder. Fig. 3 is a transverse section of the feeding-cylinder. Fig. 4 is a detached perspective view of the feed-cylinder. Fig. 5 is a longitudinal section taken on the line of the journal of the shifting-lever Q, said lever being shown in a vertical position. Fig. 6 shows three transverse sectional views on the dotted lines 1, 2, and 3, respectively, of Fig. 4. Fig. 7 is an enlarged diagrammatical view of the feed-cylinder, the same being shown with its surface spread out.

Referring now to the drawings, A represents the side beams of the frame of the machine, and B is a transverse block or beam having its end connected to the inner side of the side beams A and constructed, as will be hereinafter described, to form a support for the hopper C and also a bottom for the hopper in which the feed-cylinder D revolves.

The hopper C extends transverse the machine and is divided into a plurality of vertical compartments E for a purpose to be presently described. The lower end of this hopper is preferably provided with oppositely-extending boards F, one of which has its outer edge hinged to the adjacent edge of one of the beams B and its opposite edge adapted to be held by a latch or other mechanical securing device G.

Extending across the front end of the frame and having its end journaled therein is a driving-shaft H, carrying a drive-wheel I, said shaft H having at one end a sprocket-wheel J.

Passing transversely the frame and having its ends journaled in the side bars A directly under the hopper is a shaft K, said shaft having secured to one end a sprocket-wheel L, in a line with the sprocket J upon the front shaft. Passing around these sprockets and operatively connecting them is a sprocket-chain M of any desired construction. The sprocket-wheels J and L are preferably of the same size, whereby when the driving-shaft makes one revolution the rear transverse shaft K is caused to make one complete revolution. This rear transverse shaft K may be termed the "feed-cylinder" shaft, and situated upon this shaft is the feed-cylinder D, before referred to. This cylinder D is elongated and is loose upon the shaft, whereby it may have an endwise movement independent of the said shaft for a purpose which will now be explained. The inner side of the sprocket L is provided with one member N of a clutch, and the adjacent end of the feed-cylinder G is provided with a coöperating clutch member P, whereby when the cylinder is moved in one direction the clutch member will engage for rotating the cylinder and when the cylinder is moved endwise in the opposite direction the clutch members are carried out of operative connection, thus permitting the machine to move without operating the feed-cylinder. The endwise movement of the feed-cylinder is effected through the medium of a lever Q, which is journaled upon the hopper-support B, its inner end turned to form a fork *a* for engagement with a groove *b* in the feed-cylinder D. The outer end of this lever is turned laterally, as illustrated, to form an operating-handle, and, as will be readily understood, when this handle is moved in one direction the feed-cylinder will be carried into operative connection through the medium of the clutch and when moved in the opposite direction will be carried out of operative connection, whereby the machine will be "thrown out of gear."

Especial attention is directed to the feed-cylinder D, which extends across the machine and under the hopper. This feed-cylinder is provided with three circularly-arranged series of feed apertures or openings *d*, the said apertures or openings *d* being situated, respectively, under the several compartments of the hopper, and the series of apertures will correspond in number to the number of compartments in the hopper. These series will be numbered, respectively, 1, 2, and 3, as indicated in Fig. 4, and the series 1 is provided with three feeding-apertures d, whereby the grain will be fed at every twenty-four inches. The second series is provided with four apertures, whereby the grain will be fed at every eighteen inches, and the third series of apertures is provided with five feeding-openings, whereby the grain is fed at every fourteen inches. By means of this construction it will be seen that the operator can plant the seed near or far apart, according to the compartment of the hopper into which the seed is placed. The seed being received by the apertures, the number of seeds fed will be regulated according to the size of the apertures, and this may vary according to the kind of seed being planted. The support B is cut out under the feed-cylinder, as illustrated in Fig. 5, and inclined inward to the center, as illustrated, where an outlet-opening e is provided, said opening being in communication with a seed-spout f, to which is attached the ordinary furrow-opener g. From this description it will be noted that no matter which series of feeding-apertures is in operation the seed is delivered to the inclined bottom S, and owing to the incline thereof the seeds are conveyed to the outlet-opening thereof.

For the purpose of covering up the dropped seed I provide the disk coverers V, which are journaled upon the outer ends of the bars T. The inner ends of these bars are united to the side beams A by means of bolts i.

While I have described my invention as especially intended for planting corn and similar cereals, it is equally as well adapted for planting cotton-seed. In the latter event the feed-cylinder here shown will be removed from the shaft K and another substituted therefor, which will be a duplicate thereof, except that only one series of holes will be provided and that at the center thereof, and there will preferably be nine holes, which will receive from three to five seed each and drop them eight inches apart. I propose to furnish each machine with an additional feed-cylinder with one row of feed-openings, as just described.

By means of a planter as herein described the operator is enabled to feed the seed at various distances apart, according to the hopper or compartment into which the seed is placed, the same being simple and efficient in operation.

The above construction in addition to enabling me to plant seed at various distances apart, according to the particular compartment in which the seed are placed, also enables me to feed practically a continuous stream of seed of any kind, thus drilling the seed into the ground, by having all of the compartments filled at one time.

Having thus described my invention, what I claim, and desire to secure by Letters Patent, is—

1. A planter comprising longitudinal beams, a driving-shaft journaled between the forward ends of the beams and carrying a supporting-wheel intermediate its ends, and a driving-gear adjacent one end thereof, a transversely-arranged block B having its ends connected to the said longitudinal beams, the said block having a transverse feed-cylinder-receiving recess, a shaft having its ends journaled in the longitudinal pieces of the frame above the said block, a feed-cylinder situated loosely upon the shaft, and within the said groove of the block, the block having a converging recess communicating at its diverged end with the said feed-cylinder recess and having an exit-opening at its converged end, a hopper situated above the feed-cylinder, the shaft carrying a rigid gear outside of the hopper, a sprocket-chain operatively connecting the gear upon the driving-wheel, and the gear of the feed-cylinder shaft, the ends of the cylinder adjacent the shaft-gear and the adjacent face of the gear having an engaging clutch, the opposite end of the feed-cylinder projecting beyond the hopper, and provided with a peripheral groove, and a shifting-lever operatively engaging the said groove for moving the cylinder longitudinally upon the shaft for throwing it in and out of operation, substantially as described.

2. A planter comprising longitudinal beams, a driving-shaft journaled between the forward ends thereof and carrying a supporting-wheel, one end of the said shaft provided with a driving-gear J, a transversely-arranged block B having a feed-cylinder groove, a hopper situated over the said groove, a feed-cylinder situated within the groove below the lower end of the hopper, a shaft K having its ends journaled in the longitudinal beams and passing loosely through the said feed-cylinder, a gear L rigid upon the said shaft K, a sprocket-chain M connecting the gears J and L, the feed-cylinder and gear having engaging shoulder constituting a clutch, the feed-cylinder longitudinally movable upon the shaft K, the opposite end of the cylinder from the said clutch projecting outside of the hopper, and an operating member engaging the projecting end of the cylinder for moving it endwise, substantially as and for the purpose described.

In testimony whereof I affix my signature in presence of two witnesses.

SQUIRE T. McKNIGHT.

Witnesses:
 LOUIS L. CLUBB,
 EDWARD L. HAWK.